(12) United States Patent
Kanno et al.

(10) Patent No.: US 11,782,223 B2
(45) Date of Patent: Oct. 10, 2023

(54) OPTICAL CONNECTOR

(71) Applicant: Fujikura Ltd., Tokyo (JP)

(72) Inventors: Shuhei Kanno, Sakura (JP); Takahito Otomitsu, Sakura (JP); Kunihiko Fujiwara, Sakura (JP)

(73) Assignee: Fujikura Ltd., Tokyo (JP)

( * ) Notice: Subject to any disclaimer, the term of this patent is extended or adjusted under 35 U.S.C. 154(b) by 127 days.

(21) Appl. No.: 17/608,071

(22) PCT Filed: Jul. 10, 2020

(86) PCT No.: PCT/JP2020/027003
§ 371 (c)(1),
(2) Date: Nov. 1, 2021

(87) PCT Pub. No.: WO2021/020073
PCT Pub. Date: Feb. 4, 2021

(65) Prior Publication Data
US 2022/0229245 A1  Jul. 21, 2022

(30) Foreign Application Priority Data

Aug. 1, 2019 (JP) .................................. 2019-142037
Feb. 10, 2020 (JP) .................................. 2020-020953

(51) Int. Cl.
*G02B 6/38* (2006.01)
(52) U.S. Cl.
CPC ......... *G02B 6/3881* (2013.01); *G02B 6/3839* (2013.01); *G02B 6/3861* (2013.01)

(58) Field of Classification Search
None
See application file for complete search history.

(56) References Cited

U.S. PATENT DOCUMENTS

| 2013/0136401 A1 | 5/2013 | Cooke et al. |
| 2013/0195406 A1* | 8/2013 | Cooke .................. G02B 6/3885 264/277 |
| 2018/0188463 A1* | 7/2018 | Szumacher .......... G02B 6/3888 |

FOREIGN PATENT DOCUMENTS

| CN | 103777289 A | 5/2014 |
| CN | 203673110 U | 6/2014 |
| CN | 107918174 A | 4/2018 |
| JP | H08-122577 A | 5/1996 |
| JP | 2004-045751 A | 2/2004 |
| JP | 2015-512531 A | 4/2015 |
| JP | 2015-527619 A | 9/2015 |
| JP | 2019-066634 A | 4/2019 |

(Continued)

OTHER PUBLICATIONS

International Search Report issued in corresponding International Application No. PCT/JP2020/027003 dated Sep. 24, 2020 (3 pages).

*Primary Examiner* — Jerry Rahll
(74) *Attorney, Agent, or Firm* — Osha Bergman Watanabe & Burton LLP

(57) ABSTRACT

An optical connector includes optical fibers, a ferrule, and a pitch fixing member. The optical fibers have bare parts where coating parts have been stripped off. The ferrule has insertion holes, and the bare parts are inserted into the insertion holes. The pitch fixing member is inserted into the ferrule and has fixing parts that fix a pitch of the coating parts of the optical fibers to a pitch of the insertion holes.

8 Claims, 14 Drawing Sheets

(56) References Cited

FOREIGN PATENT DOCUMENTS

| | | |
|---|---|---|
| JP | 2019-113730 A | 7/2019 |
| WO | 2018/125706 A1 | 7/2018 |

* cited by examiner

OPTICAL CONNECTOR

CROSS-REFERENCE TO RELATED APPLICATIONS

This is a national phase application of International Patent Application No. PCT/JP2020/027003 filed Jul. 10, 2020, which claims priority to Japanese Patent Application No. 2019-142037 filed Aug. 1, 2019 and Japanese Patent Application No. 2020-020953 filed Feb. 10, 2020. The full contents of these applications are incorporated herein by reference.

TECHNICAL FIELD

The present invention relates to an optical connector.

BACKGROUND

Patent Document 1 below discloses a method of manufacturing an optical fiber assembly in which a plurality of optical fibers aligned at a predetermined pitch are integrated together by curing an adhesive.

PATENT DOCUMENT

[Patent Document 1]
Japanese Unexamined Patent Application, First Publication No. 2019-113730

For the optical fiber assembly, coating parts of a plurality of optical fibers aligned by hardened parts of an adhesive are stripped away, and the exposed bare parts are inserted into a ferrule of a mechanically transferable (MT) connector. However, since the hardened parts are arranged outside the ferrule, when the positional relationship between the ferrule and the hardened parts changes, flexure or deflection may occur on the optical fibers between the ferrule and the hardened parts. Thereby, there is a possibility that the bare parts are bent.

SUMMARY

The present invention provides an optical connector capable of suppressing the bending of bare parts.

An optical connector according to one or more embodiments of the present invention includes a plurality of optical fibers having bare parts in which coating parts of the plurality of optical fibers are stripped off; a ferrule in which a plurality of insertion holes are formed, and the bare parts are configured to be inserted into the insertion holes; and a pitch fixing member inserted into the ferrule, a plurality of fixing parts configured to fix a pitch of the coating parts of the plurality of optical fibers to a pitch of the plurality of insertion holes are formed in the pitch fixing member.

According to the configuration, since the pitch fixing member for fixing a pitch of the optical fibers is inserted into the ferrule, the positional relationship between the ferrule and the pitch fixing member is kept constant, thereby occurring flexure and deflection on the optical fibers can be suppressed between the ferrule and the pitch fixing member. As a result, the bending of the bare parts can be suppressed. Furthermore, since the pitch fixing member fixes the pitch of the coating parts of the optical fibers, a part which is bent according to fixing the pitch is the coating part. Therefore, bending in the bare parts can be suppressed.

In the optical connector, the plurality of insertion holes may be formed in a plurality of rows in the ferrule, and the plurality of fixing parts may be formed to correspond to the plurality of insertion holes.

In the optical connector, a boot in which a mounting part that mounts the pitch fixing member is formed, and which is attached to the ferrule together with the pitch fixing member may be further provided.

In the optical connector, a step may be formed in the pitch fixing member, and inlet parts of the plurality of fixing parts may be formed on the step.

In the optical connector, the plurality of fixing parts may be formed by a plurality of hole parts.

In the optical connector, the plurality of fixing parts may be formed by a plurality of groove parts and a top wall part that restricts the disengagement of the coating parts from the plurality of groove parts.

In the optical connector, the plurality of groove parts may be formed by V-shaped grooves.

In the optical connector, the top wall part may be formed by a plurality of V-shaped grooves.

In the optical connector, the coating part of the optical fiber may be supported by the fixing part at four points.

According to one or more embodiments of the present invention, the bending of the bare parts can be suppressed.

DETAILED DESCRIPTION

Hereinafter, embodiments of the present invention will be described with reference to the drawings.

First Embodiment

Figure 1:
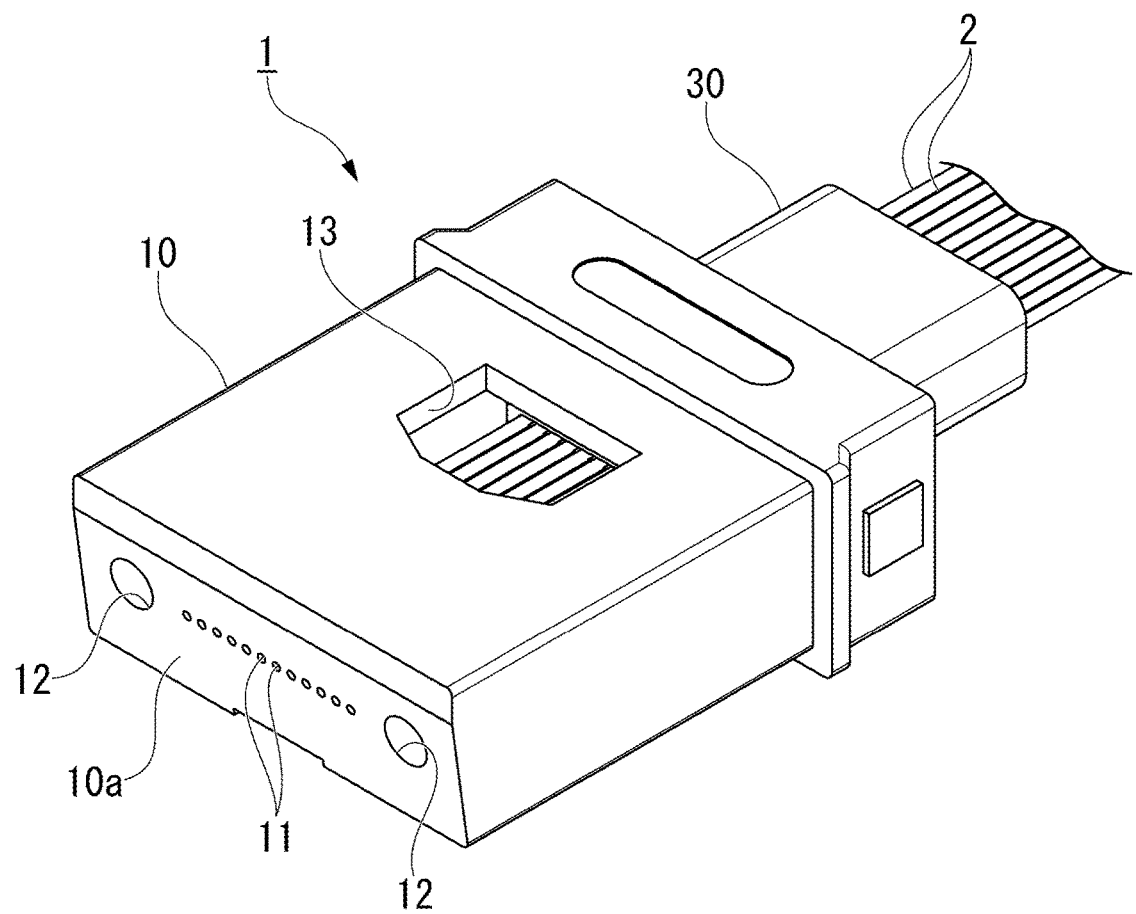
FIG. 1 is a perspective view of an optical connector according to a first embodiment.
Figure 2:
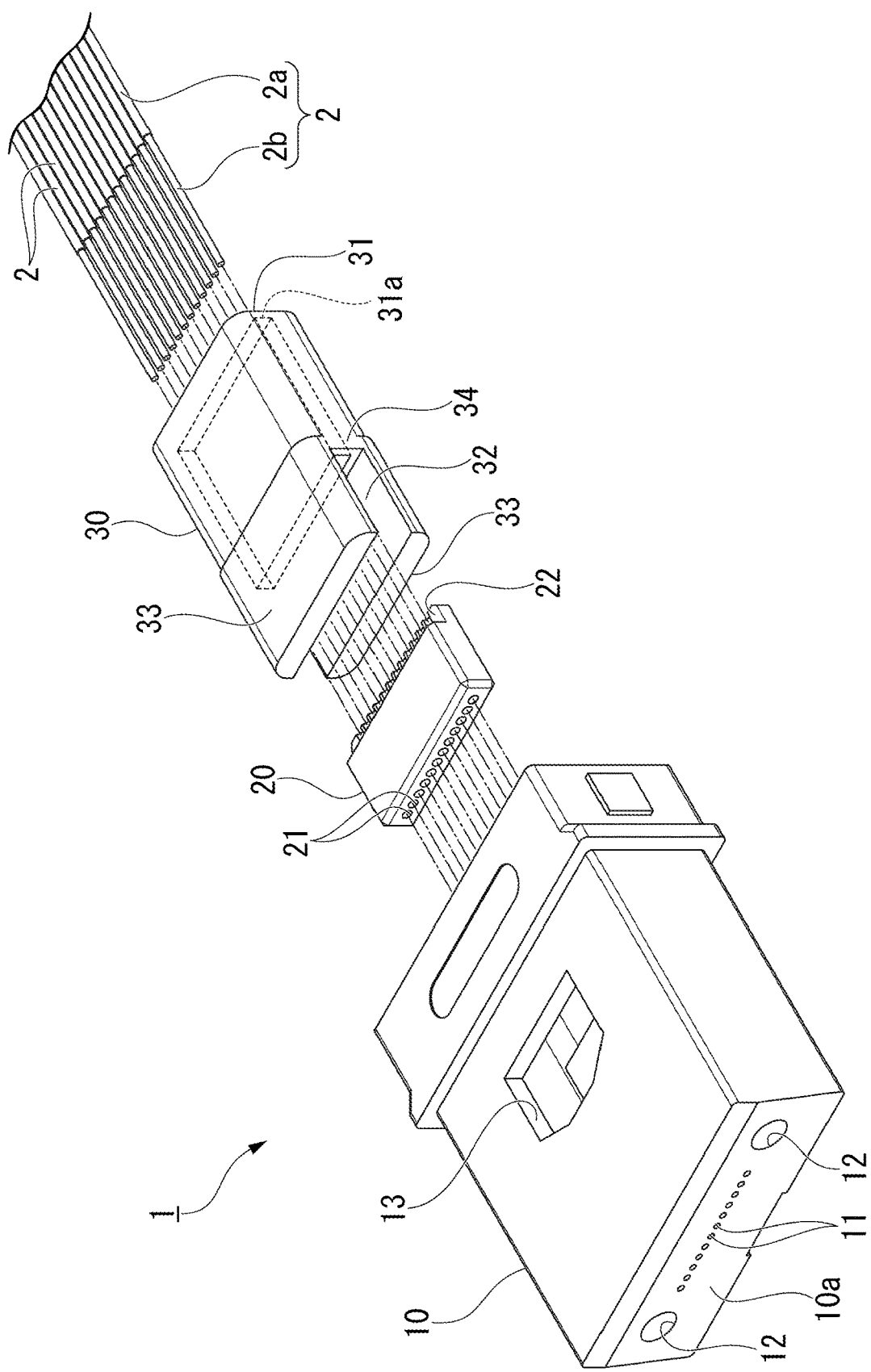
FIG. 2 is an exploded perspective view of the optical connector according to the first embodiment.
Figure 3:
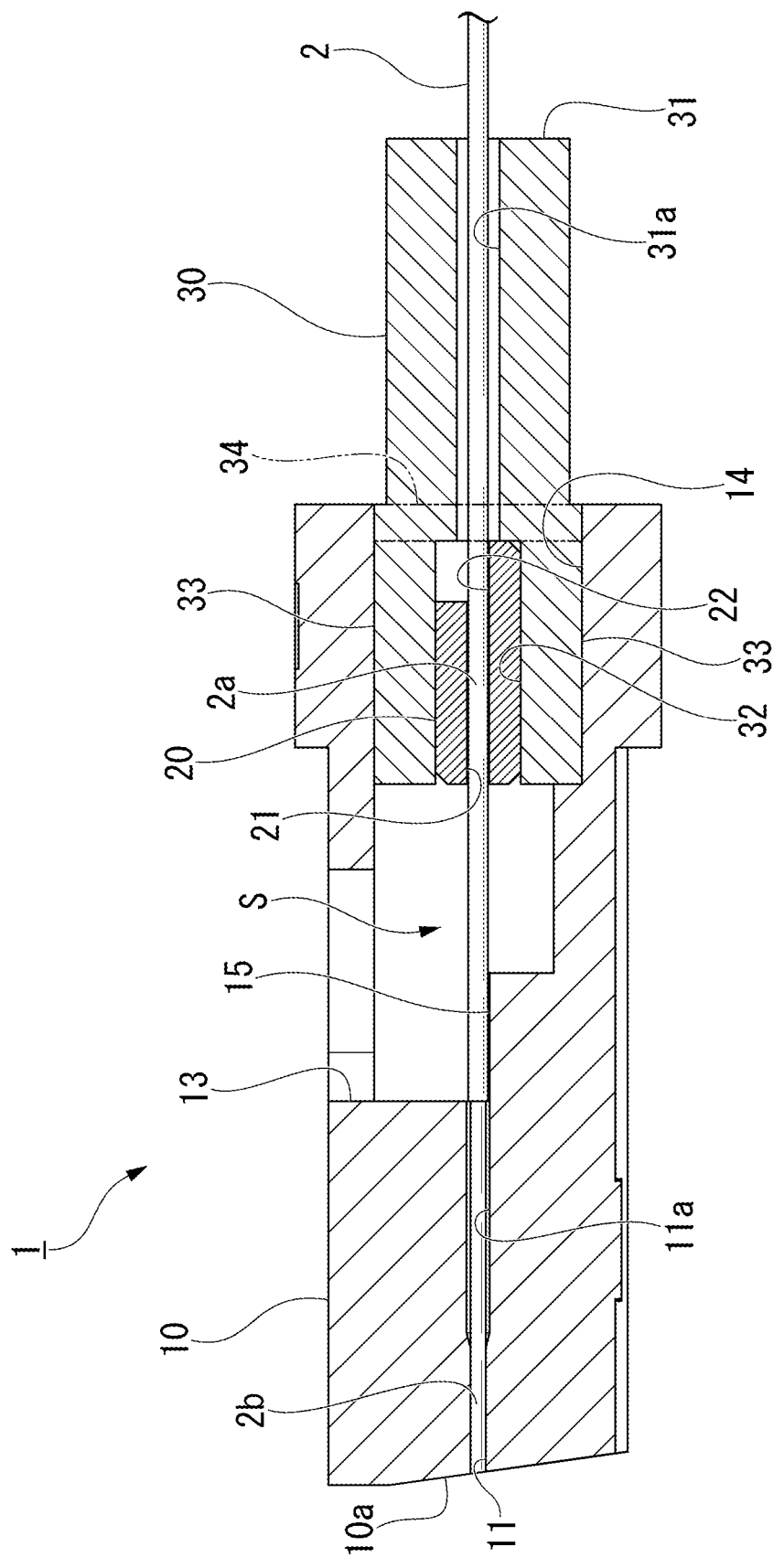
FIG. 3 is a vertical sectional view of the optical connector according to the first embodiment.

FIG. 1 is a perspective view of an optical connector 1 according to a first embodiment. FIG. 2 is an exploded perspective view of the optical connector 1 according to the first embodiment. FIG. 3 is a vertical sectional view of the optical connector 1 according to the first embodiment.

As shown in FIG. 1, the optical connector 1 includes a plurality of optical fibers 2, and a ferrule 10 into which the plurality of optical fibers 2 are inserted.

As shown in FIG. 2, the optical fibers 2 include coating parts 2a that cover core wires, and bare parts 2b in which the coating parts 2a are stripped off and the core wires are exposed. In the present embodiment, the coating parts 2a of the plurality of optical fibers 2 may be collectively coated with a resin material (outer cover) (not shown) to form a tape-shaped multi-core optical fiber cable. In the multi-core optical fiber cable, the optical fibers 2 can be separated one by one by tearing the outer cover described above. The separated optical fibers 2 are inserted into the ferrule 10.

The ferrule 10 is an MT ferrule, and a plurality of insertion holes 11 are formed in a connection end surface 10a of the ferrule 10. The bare parts 2b of the plurality of optical fibers 2 are inserted into the plurality of insertion holes 11. The connection end surface 10a of the ferrule 10 is an inclined surface inclined with respect to a connection direction of the ferrule 10. Further, the connection end surface 10a of the ferrule 10 may be a perpendicular surface at a right angle to the connection direction of the ferrule 10.

In addition, a pair of guide holes 12 for alignment are formed on the connection end surface 10a of the ferrule 10. On the other hand, a pair of guide pins to be inserted into the guide holes 12 are provided on the connection end surface of the ferrule on the other side (not shown). Further, the guide pins may be provided on the connection end surface 10a of the ferrule 10 instead of the guide holes 12. In addition, the guide holes 12 and the guide pins may each be provided on the connection end surface 10a of the ferrule 10.

As shown in FIG. 3, an opening part 14 is formed on a surface opposite to the connection end surface 10a of the ferrule 10. A boot 30 is inserted into the opening part 14 together with a pitch fixing member 20 described later. The boot 30 is a flexible member formed of rubber, elastomer, or the like. The boot 30 includes a tubular body part 31 and a mounting part 32.

The tubular body part 31 protrudes rearward from the opening part 14 and flexibly supports the optical fibers 2 outside the ferrule 10. As shown in FIG. 2, a long hole 31a through which the plurality of optical fibers 2 (tape-shaped cable part) are inserted is formed in the tubular body part 31. The long hole 31a extends to the mounting part 32. As shown in FIG. 3, the mounting part 32 is inserted into the ferrule 10, and also is fitted to an inner wall surface of the opening part 14 in a slightly compressed press-fit state.

The mounting part 32 includes a pair of holding parts 33 and a sealing part 34. As shown in FIG. 3, the pair of holding parts 33 and the sealing part 34 are connected in a C shape in a cross-sectional view. A space part for mounting the pitch fixing member 20 is formed inside the C-shape. As shown in FIG. 2, the pair of holding parts 33 are formed in a plate shape having substantially the same dimensions as the width and the length of the pitch fixing member 20 to sandwich the pitch fixing member 20 by the upper side of the holding parts 33 and the lower side of the holding parts 33.

The sealing part 34 is formed in a lid shape (plate shape) in contact over an entire circumference with the inner wall surface of the opening part 14 of the ferrule 10 behind the pair of holding parts 33. A step 15 is formed in an inner space S of the ferrule 10 in front of the boot 30. Tapered hole parts 11a that bring the bare parts 2b of the optical fibers 2 into the insertion holes 11 described above are formed in the step 15.

The inner space S is filled with an adhesive (not shown). The adhesive is filled in the inner space S from a window part 13 formed in the ferrule 10. The sealing part 34 prevents the adhesive filled in the inner space S from leaking from the opening part 14. Further, since the pair of holding parts 33 and the pitch fixing member 20 are designed in conformity with the dimensions of the opening part 14, a gap between the pair of holding parts 33 and the pitch fixing member 20, and the opening part 14 becomes small. As a result, the leakage of the adhesive can be prevented even in this portion.

As shown in FIG. 2, the pitch fixing member 20 is formed in a substantially rectangular plate shape. A plurality of fixing parts 21 through which the plurality of optical fibers 2 are inserted are formed in the pitch fixing member 20. The plurality of fixing parts 21 fix the pitch of the coating parts 2a of the plurality of inserted optical fibers 2 to the pitch of the plurality of insertion holes 11. In other words, the pitch of the plurality of fixing parts 21 and the pitch of the plurality of insertion holes 11 are equal to each other. A step 22 is formed on an insertion side of the optical fibers 2 of the pitch fixing member 20.

Figure 4:
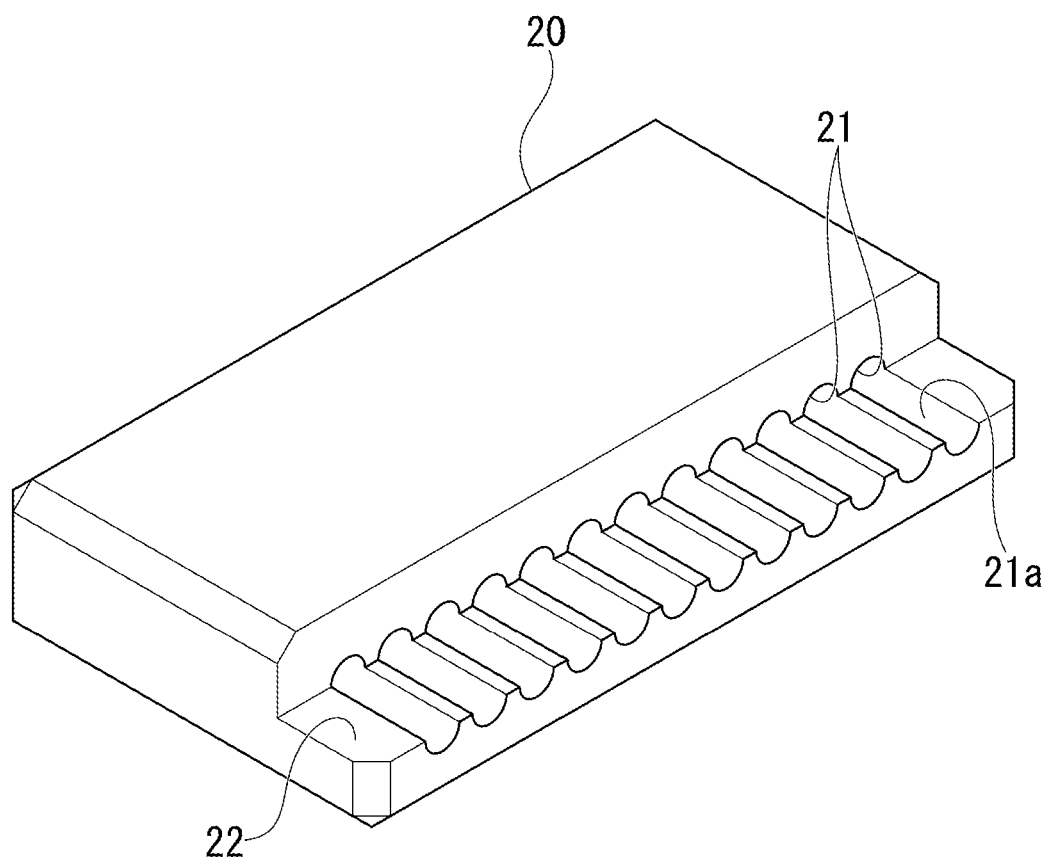
FIG. 4 is a perspective view of a pitch fixing member according to the first embodiment.
Figure 5:
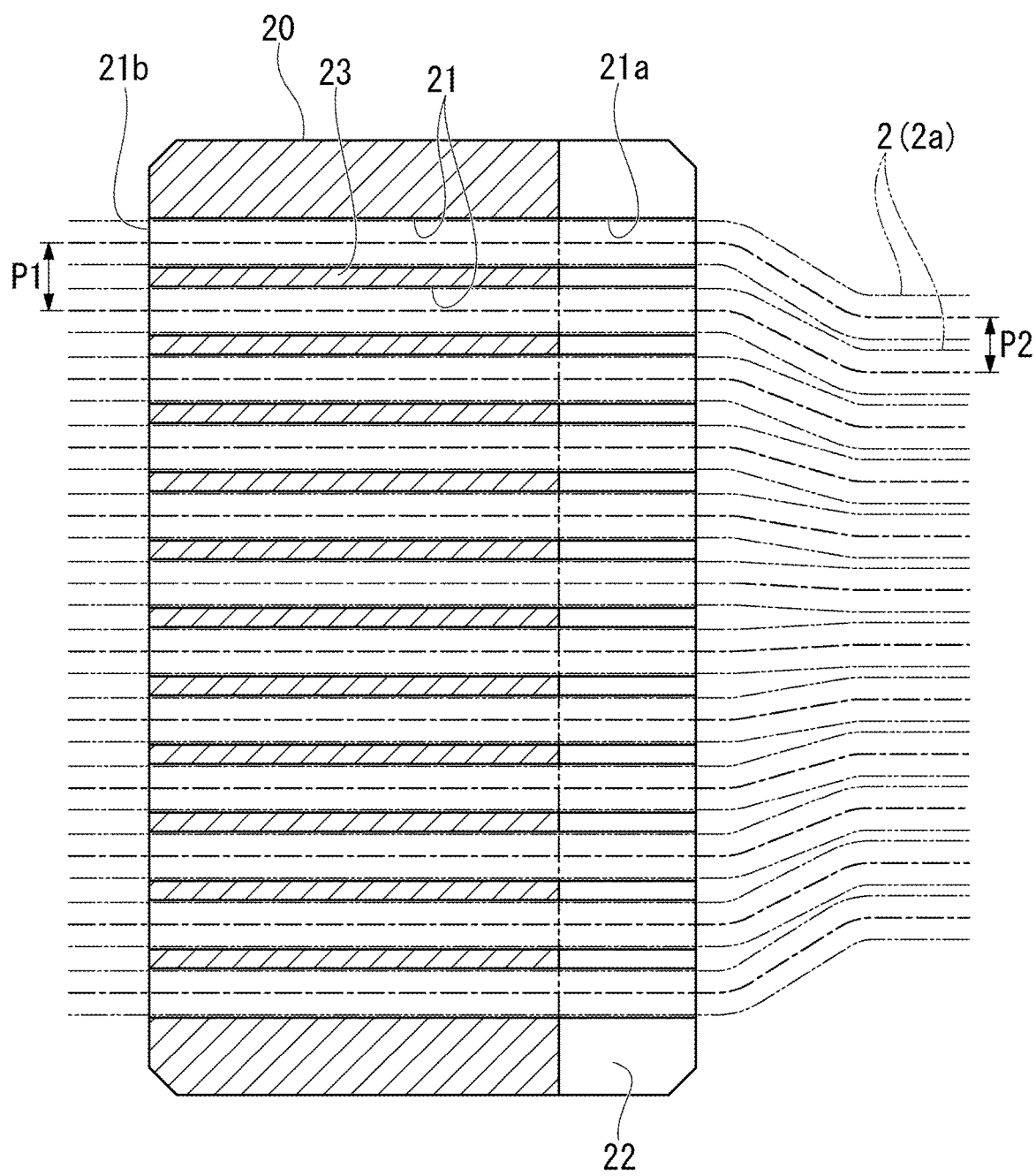
FIG. 5 is a plan sectional view taken along a step of the pitch fixing member according to the first embodiment.
Figure 6:
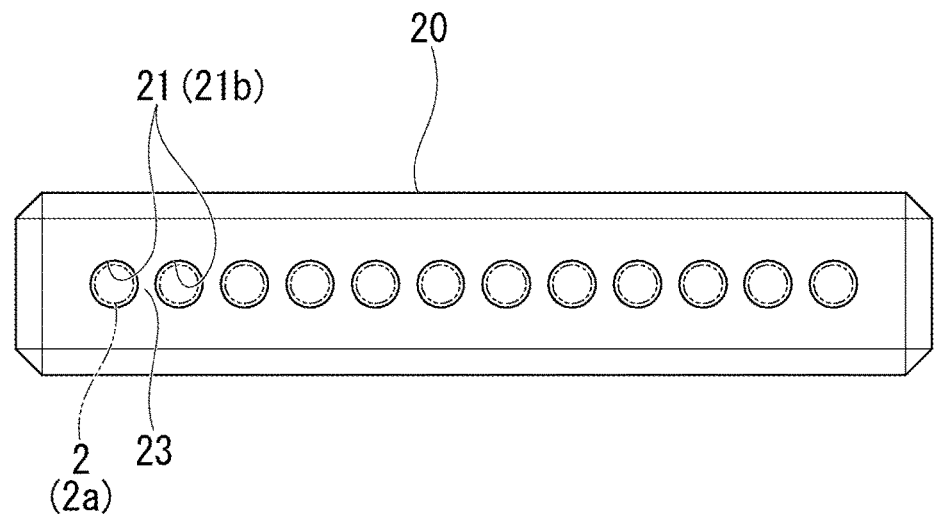
FIG. 6 is a front view of an outlet part side of the pitch fixing member according to the first embodiment.

FIG. 4 is a perspective view of the pitch fixing member 20 according to the first embodiment. FIG. 5 is a plan sectional view taken along the step 22 of the pitch fixing member 20 according to the first embodiment. FIG. 6 is a front view of the pitch fixing member 20 according to the first embodiment on a side of outlet parts 21b.

As shown in FIGS. 4 and 6, the plurality of fixing parts 21 of the present embodiment are formed by a plurality of hole parts.

An inner diameter of the fixing part 21 (hole part) is slightly larger than a coating diameter of the optical fiber 2. In other words, the fixing part 21 has an inner diameter through which the coating part 2a of the optical fiber 2 can be inserted. As shown in FIG. 6, a partition wall 23 is formed between the adjacent fixing parts 21. Furthermore, as shown in FIG. 4, inlet parts 21a of the plurality of fixing parts 21 are formed on the step 22 of the pitch fixing member 20. The inlet part 21a has a semicircular groove shape in which the lower half of the fixing part 21 (hole part) is extended to the step 22.

As shown in FIG. 5, the plurality of fixing parts 21 are formed at a constant pitch P1 from the inlet parts 21a to the outlet parts 21b. The pitch P1 of the fixing parts 21 is equal to the pitch of the insertion holes 11 of the ferrule 10 described above, and is larger than the pitch P2 of the optical fibers 2. Here, the pitch P2 of the optical fibers 2 is a pitch of the optical fibers 2 which is the tape-shaped multi-core optical fiber cable. In general, the pitch P2 of the optical fibers 2 is equal to the coating diameter of the optical fiber 2.

For example, the pitch P2 (coating diameter) of the optical fibers 2 is 160 μm or 200 μm, and the pitch P1 of the fixing parts 21 is 250 μm. Therefore, the optical fibers 2 can be converted to the pitch P1 by simply inserting the optical fibers 2 into the fixing parts 21 without using a special jig or an adhesive. The pitch fixing member 20 may be made of a plastic material, thereby forming fixing parts 21 (hole parts) having high dimensional accuracy.

According to the optical connector 1 having the above configuration, the plurality of optical fibers 2, the ferrule 10 provided with the plurality of insertion holes 11 into which the bare parts 2b stripped where the coating parts 2a of the plurality of optical fibers 2 are stripped off are inserted, and the pitch fixing member 20 inserted into the ferrule 10, and provided with the plurality of fixing parts 21 that fix a pitch of the coating parts 2a of the plurality of optical fibers 2 to a pitch of the plurality of insertion holes 11 are provided. Therefore, bending in the bare parts 2b of the optical fibers 2 can be suppressed.

That is, as shown in FIG. 3, since the pitch fixing member 20 that fixes a pitch of the optical fibers 2 is inserted into the ferrule 10, the positional relationship between the ferrule 10 and the pitch fixing member 20 is kept constant, and occurring flexure and deflection on the optical fibers 2 can be suppressed between the ferrule 10 and the pitch fixing member 20. As a result, the bending of the bare parts 2b can be suppressed. Furthermore, since the pitch fixing member 20 fixes a pitch in the coating parts 2a of the optical fibers 2, the coating parts 2a are bent as the pitch is fixed (changed from the pitch P2 to the pitch P1 shown in FIG. 5), and bending in the bare parts 2b can be suppressed.

In addition, as shown in FIG. 2, since the present embodiment has the boot 30 in which the mounting part 32 that mounts the pitch fixing member 20 is formed and is attached to the ferrule 10 together with the pitch fixing member 20, the pitch fixing member 20 can be easily assembled into the ferrule 10 with no additional processing on a side of the ferrule 10. Moreover, since the pitch fixing member 20 is covered with the boot 30, the adhesive filled in the inner space S of the ferrule 10 can be prevented from leaking from the opening part 14.

In addition, in the present embodiment, as shown in FIG. 4, the optical fibers 2 are easily inserted into the fixing parts 21, since the step 22 is formed in the pitch fixing member 20, and the inlet parts 21a of the plurality of fixing parts 21 are formed on the step 22.

Furthermore, in the present embodiment, as shown in FIG. 6, since the plurality of fixing parts 21 are formed by the plurality of hole parts, the partition wall 23 is formed between the adjacent fixing parts 21. As a result, once the optical fibers 2 are inserted into the fixing parts 21, the optical fibers 2 on the left and right will not be misplaced.

Second Embodiment

Next, a second embodiment of the present invention will be described. In the following description, the same or equivalent configuration as that in the above-described embodiment are designated by the same reference numerals, and a description thereof will be simplified or omitted.

Figure 7:
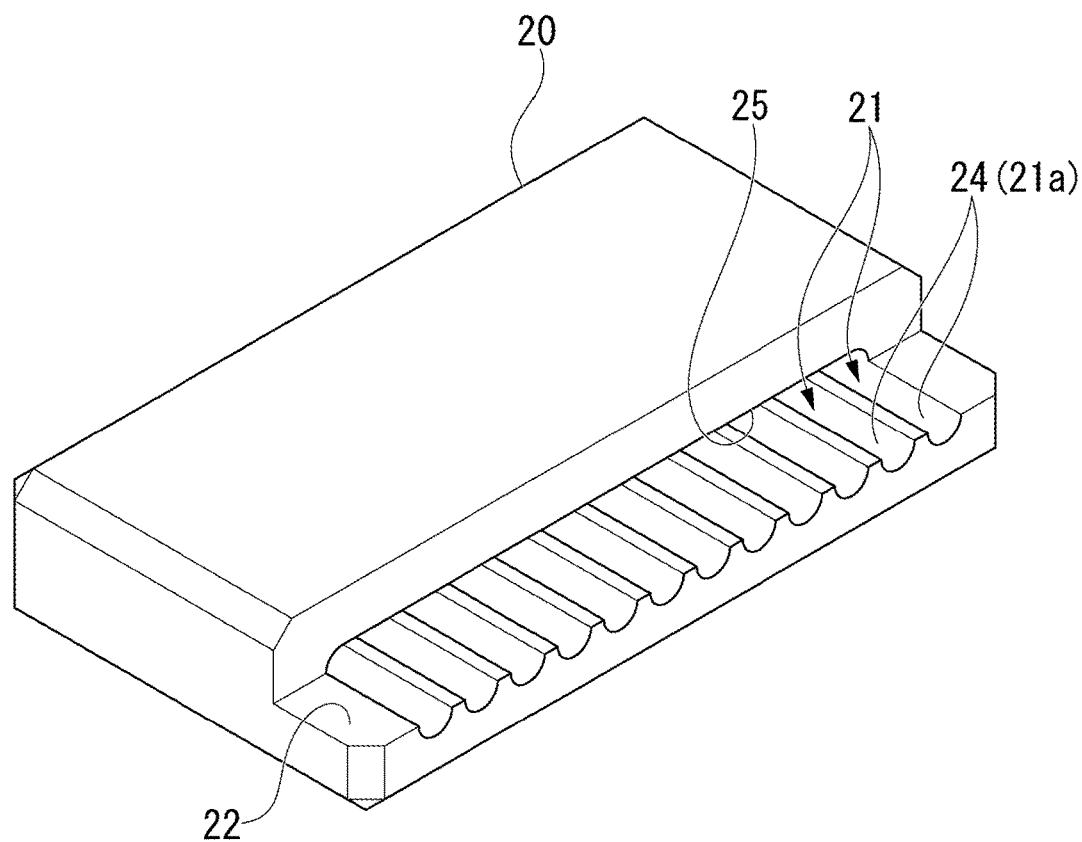
FIG. 7 is a perspective view of a pitch fixing member according to a second embodiment.
Figure 8:
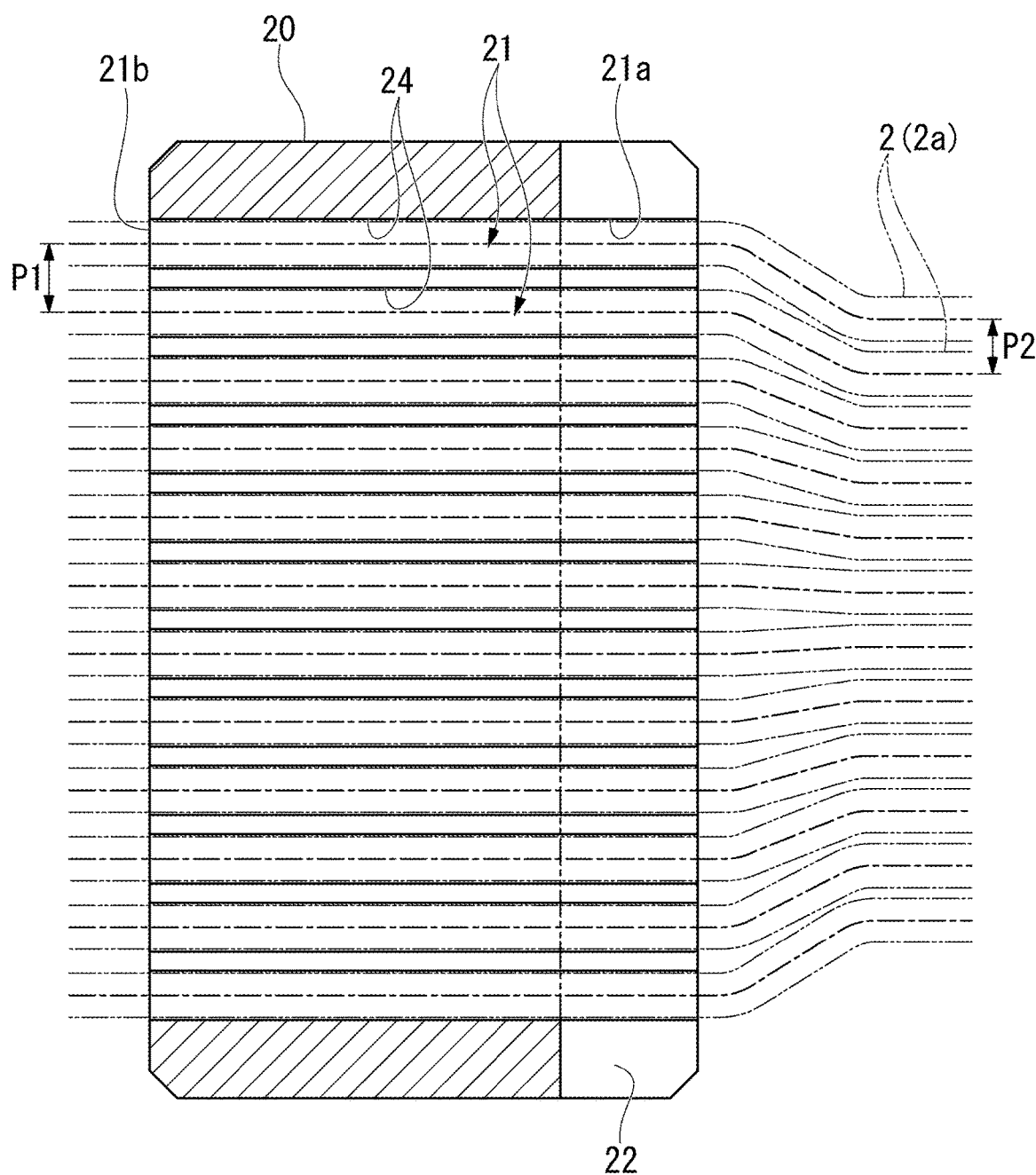
FIG. 8 is a plan sectional view taken along a step of the pitch fixing member according to the second embodiment.
Figure 9:
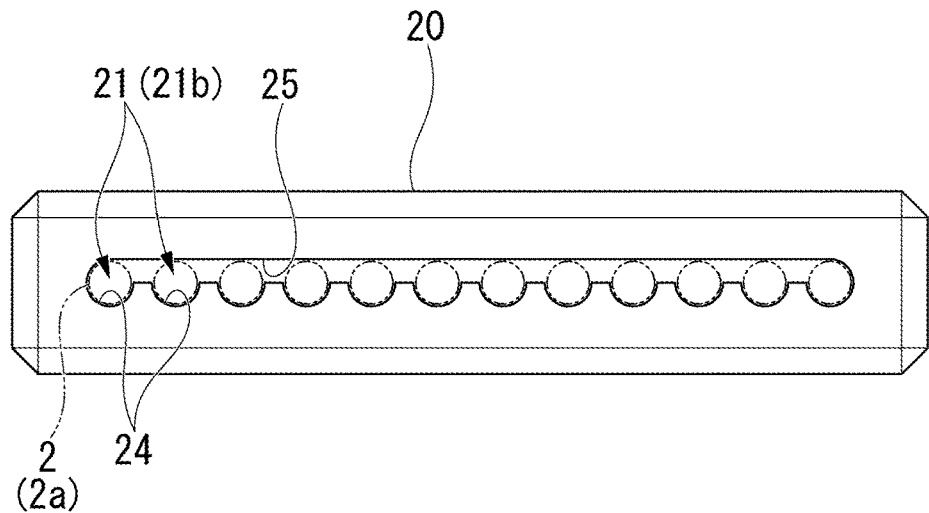
FIG. 9 is a front view of an outlet part side of the pitch fixing member according to the second embodiment.

FIG. 7 is a perspective view of the pitch fixing member 20 according to the second embodiment. FIG. 8 is a plan sectional view taken along the step 22 of the pitch fixing member 20 according to the second embodiment. FIG. 9 is a front view of the pitch fixing member 20 according to the second embodiment on a side of the outlet parts 21b.

As shown in FIGS. 7 and 9, the plurality of fixing parts 21 of the second embodiment are formed by a plurality of groove parts 24 and a top wall part 25 that restricts the disengagement of the optical fibers 2 (coating parts 2a) from the plurality of groove parts 24.

As shown in FIG. 8, the plurality of groove parts 24 are formed at a constant pitch P1 from the inlet parts 21a to the outlet parts 21b of the fixing parts 21. As shown in FIG. 9, the groove part 24 is a semicircular groove that surrounds the lower half of the optical fiber 2. The top wall part 25 faces the groove parts 24 with a gap between the top wall part 25 and each of the plurality of groove parts 24. The minimum gap between the top wall part 25 and the groove parts 24 may be set to be less than a diameter (coating diameter) of the optical fiber 2. The minimum gap may also be set equal to or less than a radius of the optical fiber 2 which is a half of the optical fiber 2 to prevent the optical fiber 2 from being disengaged from the groove part 24.

According to the second embodiment having the above configuration, the plurality of fixing parts 21 are formed by the plurality of groove parts 24 and the top wall part 25 that restricts the disengagement of the coating parts 2a from the plurality of groove parts 24. With this configuration, as shown in FIG. 9, the adjacent fixing parts 21 can be spatially communicated with each other, and the partition wall 23 (see FIG. 6) of the first embodiment described above can be eliminated. When the pitch P1 of the fixing parts 21 is narrow, the thickness of the partition wall 23 is thin and the partition wall 23 tends to be brittle. Therefore, according to the second embodiment, a suitable structure can be provided even when the pitch P1 of the fixing part 21 is narrow.

Third Embodiment

Next, a third embodiment of the present invention will be described. In the following description, the same or equivalent configuration as that in the above-described embodiment are designated by the same reference numerals, and a description thereof will be simplified or omitted.

Figure 10:
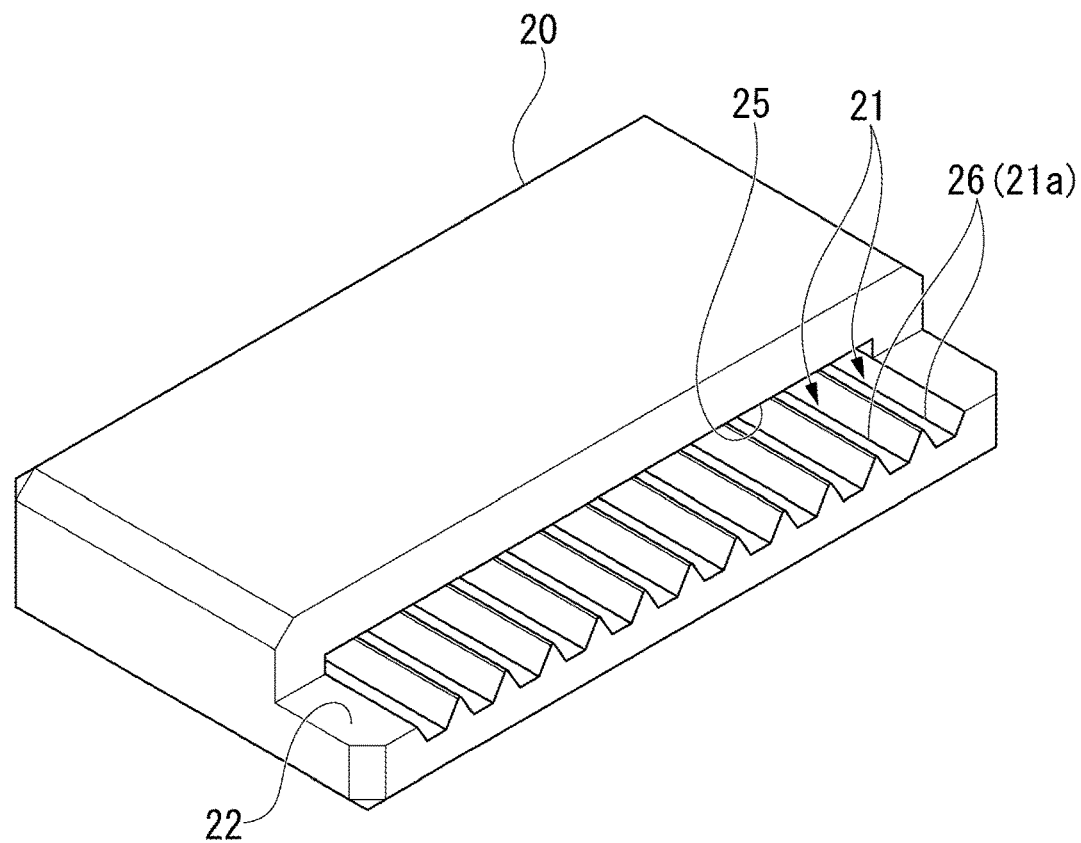
FIG. 10 is a perspective view of a pitch fixing member according to a third embodiment.
Figure 11:
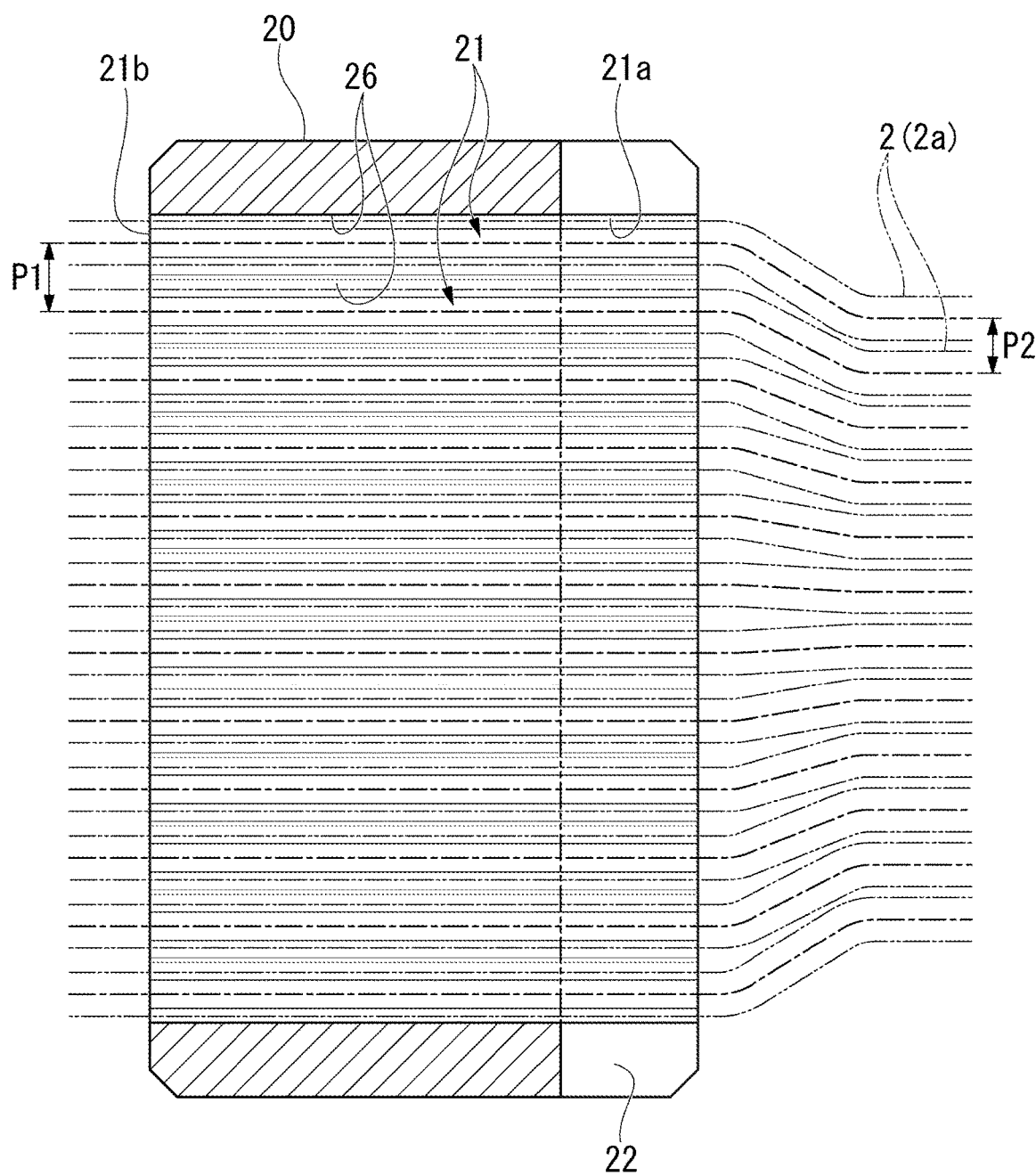
FIG. 11 is a plan sectional view taken along a step of the pitch fixing member according to the third embodiment.
Figure 12:
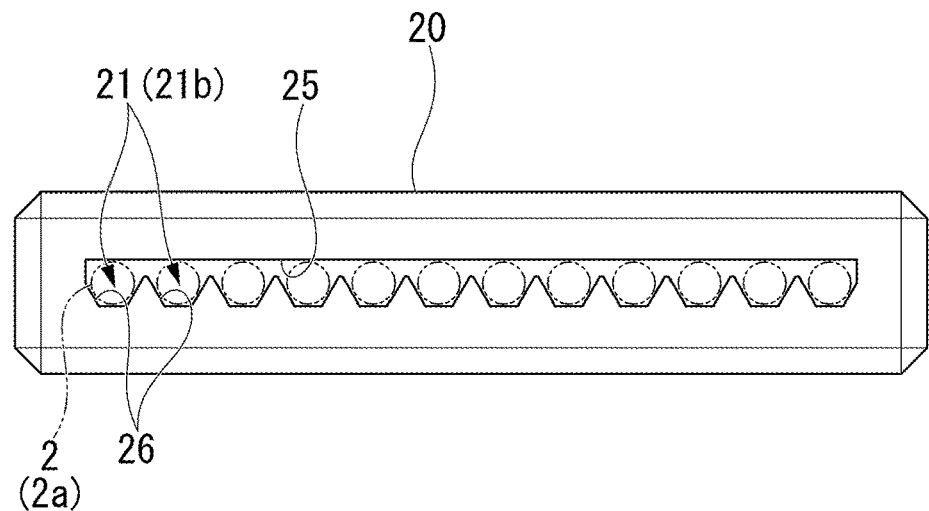
FIG. 12 is a front view of an outlet part side of the pitch fixing member according to the third embodiment.

FIG. 10 is a perspective view of the pitch fixing member 20 according to the third embodiment. FIG. 11 is a plan sectional view taken along the step 22 of the pitch fixing member 20 according to the third embodiment. FIG. 12 is a front view of the pitch fixing member 20 according to the third embodiment on a side of the outlet parts 21b.

As shown in FIGS. 10 and 12, the plurality of fixing parts 21 of the third embodiment are different from the second embodiment in that V-shaped groove parts 26 are provided.

As shown in FIG. 11, the plurality of groove parts 26 are formed at a constant pitch P1 from the inlet parts 21a to the outlet parts 21b of the fixing parts 21. As shown in FIG. 12, the groove part 26 is a V-shaped groove to be in contact with the lower half of the optical fiber 2 at least two points. The top wall part 25 faces the groove parts 26 with a gap between the top wall part 25 and each of the plurality of groove parts 26. The minimum gap between the top wall part 25 and the groove part 26 may be set to be less than a diameter (coating diameter) of the optical fiber 2. The minimum gap may also be set equal to or less than a radius of the optical fiber 2 which is a half of the optical fiber 2 to prevent the optical fiber 2 from being disengaged from the groove part 26.

According to the third embodiment having the above configuration, in addition to the same effects as those of the second embodiment, since the plurality of groove parts 26 are formed by V-shaped grooves, the number of contact points is increased to at least two with respect to one optical fiber 2, and the optical fiber 2 can be stably supported in the fixing part 21. Therefore, the pitch of the optical fibers 2 can be changed to the pitch of the insertion holes 11 of the ferrule 10 with high accuracy, and bending can be more reliably suppressed in the bare parts 2b.

Fourth Embodiment

Next, a fourth embodiment of the present invention will be described. In the following description, the same or equivalent configuration as that in the above-described embodiment are designated by the same reference numerals, and a description thereof will be simplified or omitted.

Figure 13:
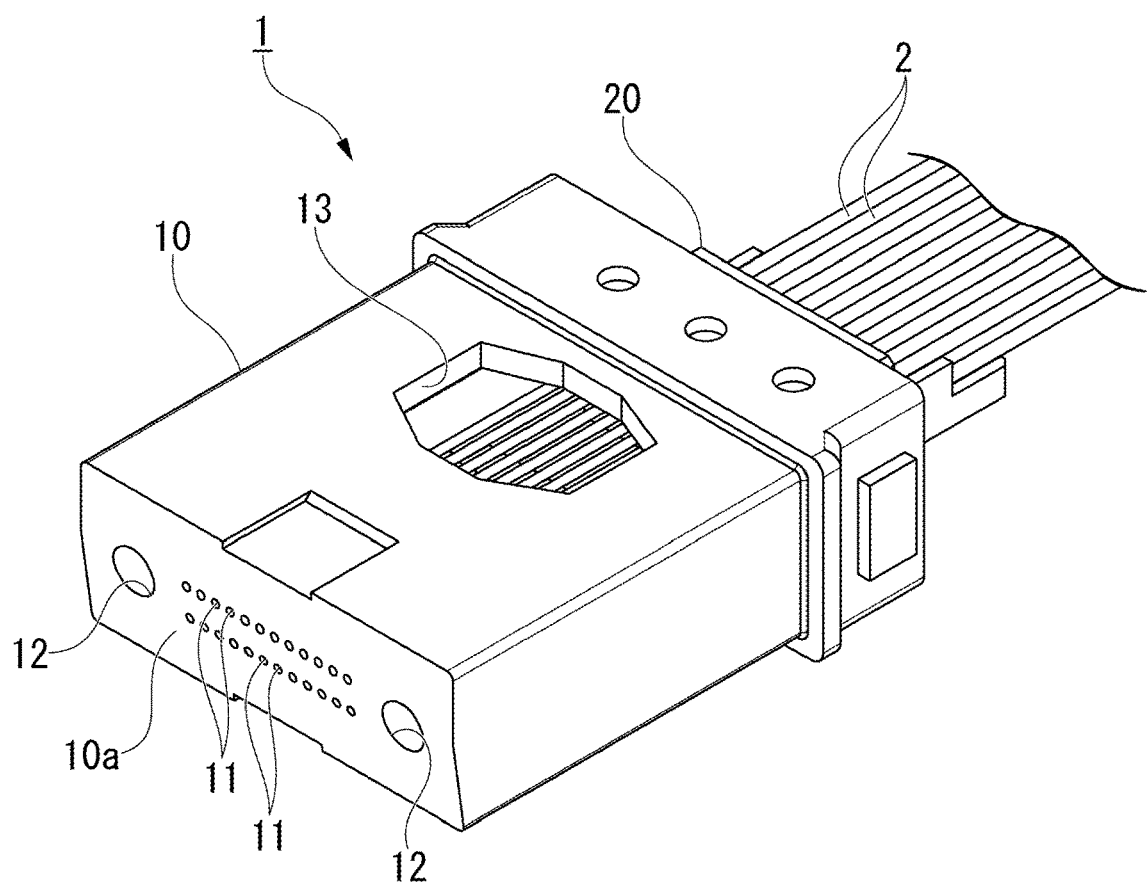
FIG. 13 is a perspective view of an optical connector according to a fourth embodiment.
Figure 14:
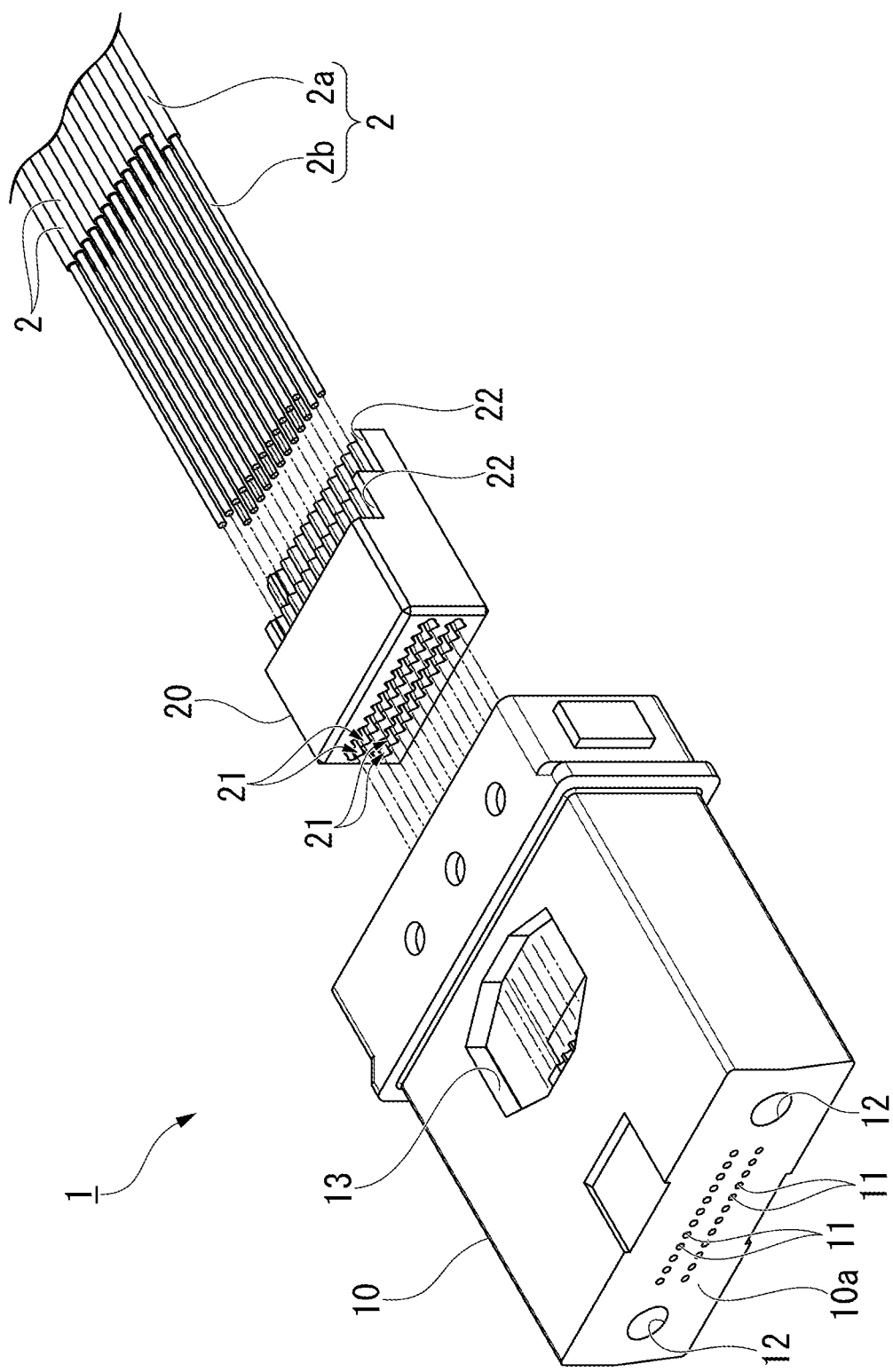
FIG. 14 is an exploded perspective view of the optical connector according to the fourth embodiment.
Figure 15:
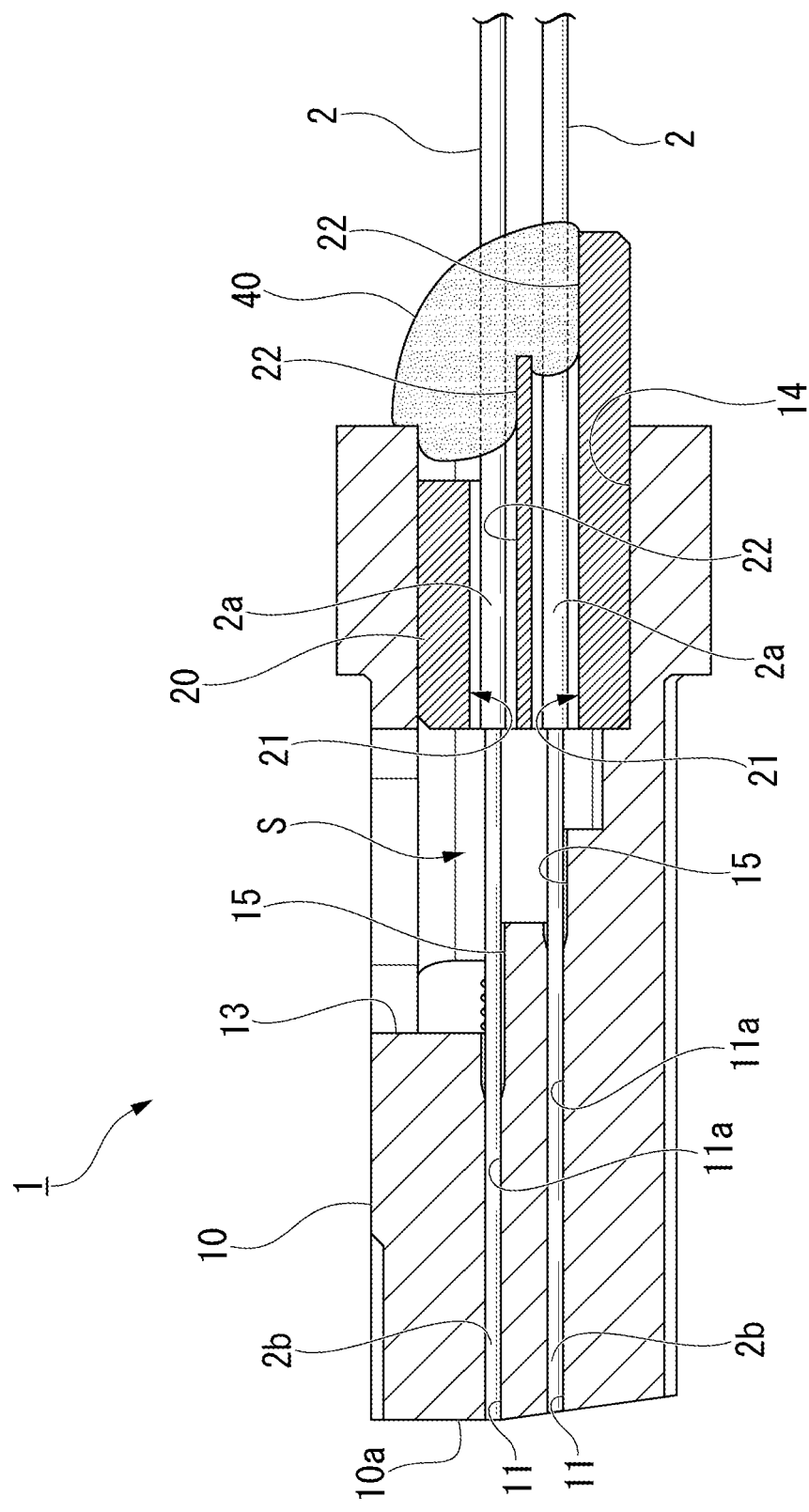
FIG. 15 is a vertical sectional view of the optical connector according to the fourth embodiment.

FIG. 13 is a perspective view of an optical connector 1 according to the fourth embodiment. FIG. 14 is an exploded perspective view of the optical connector 1 according to the fourth embodiment. FIG. 15 is a vertical sectional view of the optical connector 1 according to the fourth embodiment.

As shown in FIG. 13, the ferrule 10 of the fourth embodiment is different from the above embodiment in that the plurality of insertion holes 11 into which the optical fibers 2 are inserted are formed in a plurality of rows. In other words, the insertion holes 11 arranged in a row in a predetermined direction are formed in a plurality (of rows) on the connection end surface 10a of the ferrule 10. Further, in the ferrule 10 shown in FIG. 13, the insertion holes 11 are formed in two rows, but the insertion holes 11 may be formed in two or more rows (e.g., four rows, six rows, etc.).

As shown in FIGS. 14 and 15, the pitch fixing member 20 is inserted into the opening part 14 that is a side opposite to the connection end surface 10a of the ferrule 10. A plurality of rows (two rows) of fixing parts 21 corresponding to the plurality of rows (two rows) of the insertion holes 11 of the ferrule 10 is formed in the pitch fixing member 20. Further, a thickness of the pitch fixing member 20 is increased by forming a plurality of rows of the fixing parts 21, and the boot 30 of the above embodiment is not provided. Further, if the opening part 14 is formed to be large, the pitch fixing member 20 may be mounted on the boot 30, similarly to the above embodiments.

Stair-like steps 22 corresponding to a plurality of rows (two rows) of insertion holes 11 are provided on a side of the pitch fixing member 20 into which the optical fibers 2 are inserted, and as shown in FIG. 15, at least a part of the steps 22 protrude from the opening part 14 of the ferrule 10 to an outside of the ferrule 10. Instead of the boot 30, a plurality of steps 22 protruding from the ferrule 10 may be applied with an adhesive 40. The adhesive 40 may be a silicone-based adhesive having flexibility capable of absorbing impact similarly to the boot 30, and as a result the optical fibers 2 extending from the pitch fixing member 20 can be molded at the steps 22 to absorb a bending load applied to the optical fibers 2.

As shown in FIG. 15, the pitch fixing member 20 is inserted into the ferrule 10, and also is fitted to an inner wall surface of the opening part 14. A plurality of steps (two steps) 15 corresponding to a plurality of rows of insertion holes 11 of the optical fibers 2 are formed in the inner space S of the ferrule 10 located forward in a direction in which the optical fibers 2 are inserted from the pitch fixing member 20. Tapered hole parts 11a that bring the bare parts 2b of the optical fibers 2 into the insertion holes 11 as described above are formed in each of the plurality of steps 15. With this configuration, the optical fibers 2 can be smoothly inserted from the pitch fixing member 20 toward the ferrule 10. The inner space S is filled with an adhesive (not shown). The adhesive is filled in the inner space S from a window part 13 formed in the ferrule 10. The pitch fixing member 20 prevents the adhesive filled in the inner space S from leaking from the opening part 14.

Figure 16:
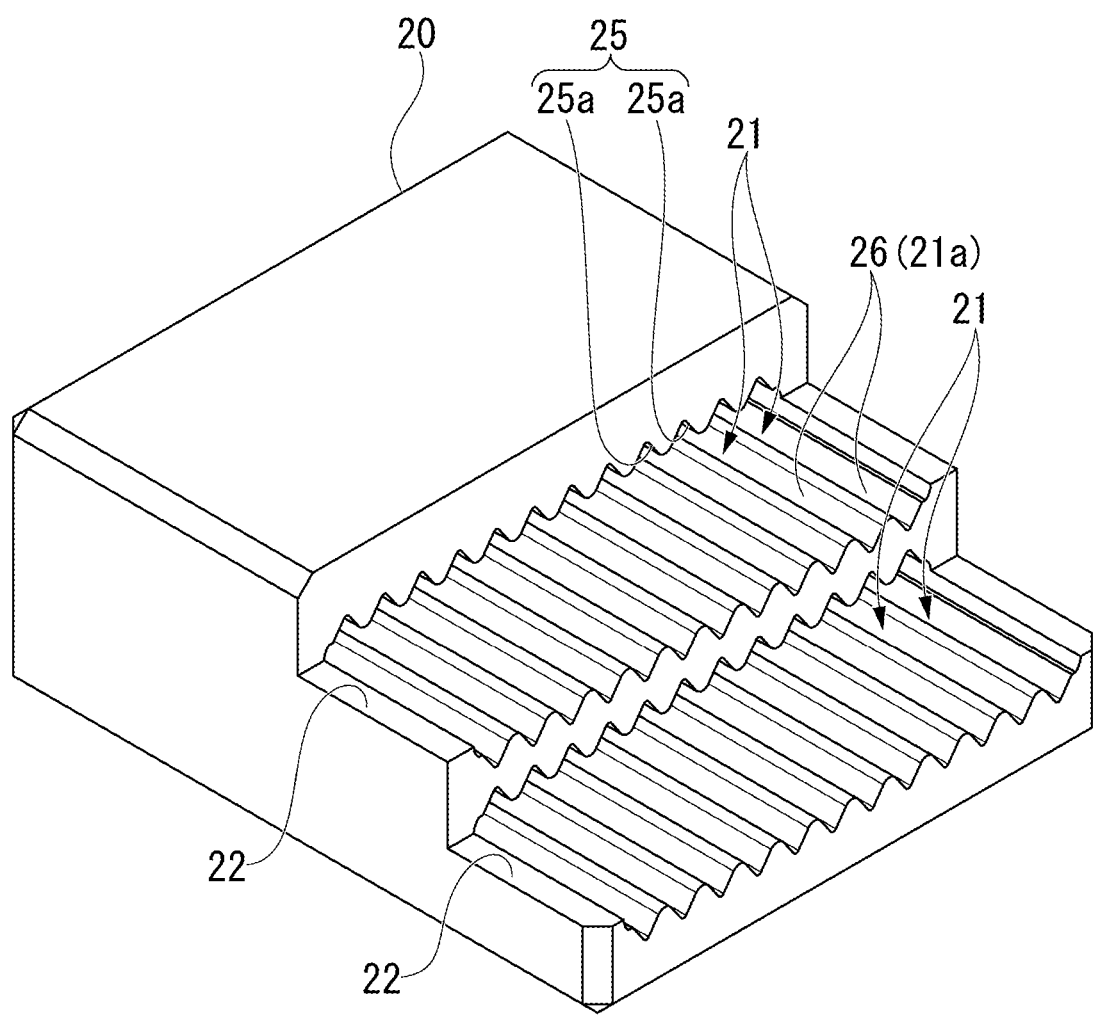
FIG. 16 is a perspective view of a pitch fixing member according to the fourth embodiment.
Figure 17:
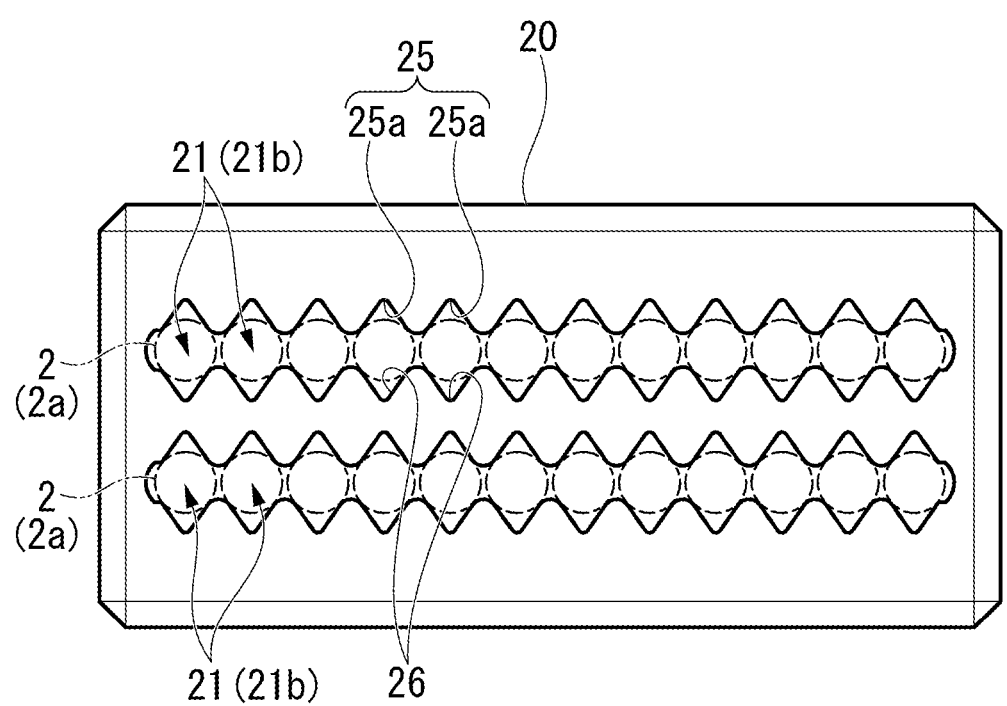
FIG. 17 is a front view of an outlet part side of the pitch fixing member according to the fourth embodiment.

FIG. 16 is a perspective view of the pitch fixing member 20 according to a fourth embodiment. FIG. 17 is a front view of the pitch fixing member 20 according to the fourth embodiment on a side of the outlet parts 21b.

As shown in FIGS. 16 and 17, in the plurality of fixing parts 21 of the fourth embodiment, not only the plurality of groove parts 26 but also the top wall part 25 are formed by a plurality of V-shaped grooves 25a.

As shown in FIG. 16, inlet parts 21a of the plurality of fixing parts 21 are formed in each of the plurality of steps 22 of the pitch fixing member 20. The inlet part 21a is a V-shaped groove in which the lower half (groove part 26) of the fixing part 21 is extended to the step 22. Furthermore, as shown in FIG. 17, the V-shaped groove 25a of the top wall part 25 has a shape in which the groove part 26 is turned upside down. Moreover, the V-shaped grooves 25a of the top wall part 25 have the same number and the same pitch as those of the groove parts 26.

According to the fourth embodiment having the above configuration, in addition to the same effects as those of the third embodiment, since not only the groove parts 26 but also the top wall part 25 is formed by the plurality of V-shaped grooves 25a, the coating part 2a of the optical fiber 2 is supported by the fixing part 21 at four points. In other words, the number of contact points of the fixing part 21 is increased to at least two in the upper half (top wall part 25) with respect to one optical fiber 2 (coating part 2a), and the optical fiber 2 can be stably supported in the fixing part 21 at a total of four points. Therefore, the pitch of the optical fibers 2 can be changed to the pitch of the insertion holes 11 of the ferrule 10 with high accuracy, and bending can be more reliably suppressed in the bare parts 2b.

While a limited number of embodiments of the invention have been described and illustrated above, it should be understood that these are exemplary of the invention and are not to be considered as limiting. Those skilled in the art, having benefit of this disclosure, will appreciate that various other embodiments may be devised without departing from the scope of the present invention. Additions, omissions, substitutions, and other modifications can be made without departing from the scope of the invention. Accordingly, the invention is not to be considered as being limited by the foregoing description and is only limited by the scope of the appended claims.

For example, in the first to third embodiments, a configuration in which the pitch fixing member 20 is mounted to the boot 30 and inserted into the ferrule 10 has been illustrated, but, as in the fourth embodiment, the pitch fixing member 20 alone may be inserted and mounted inside the ferrule 10.

In addition, for example, in the fourth embodiment, the configuration in which the coating part 2a of the optical fiber 2 is supported by the fixing part 21 at four points by forming the V-shaped groove 25a in the top wall part 25 has been described, but for example, if the shape of the fixing part 21 (hole part) of the first embodiment (see FIG. 6) is a diamond shape, the coating part 2a of the optical fiber 2 can be supported by the fixing part 21 (diamond-shaped hole part) at four points, similarly to the fourth embodiment.

REFERENCE NUMERALS LIST

1: Optical connector
2: Optical fiber
2a: Coating part
2b: Bare part
10: Ferrule
11: Insertion hole
20: Pitch fixing member
21: Fixing part
21a: Inlet part
22: Step
24: Groove part
25: Top wall part
25a: V-shaped groove
26: Groove part 30: Boot
32: Mounting part

What is claimed is:

1. An optical connector comprising:
   optical fibers having bare parts where coating parts have been stripped off;
   a ferrule having insertion holes into which the bare parts are inserted; and
   a pitch fixing member that is inserted into the ferrule and that has fixing parts that fix a pitch of the coating parts of the optical fibers to a pitch of the insertion holes, wherein
   the pitch fixing member has a step, and
   inlet parts of the fixing parts are formed on the step.

2. The optical connector according to claim 1, wherein the insertion holes are disposed in rows, and
   the fixing parts correspond to the insertion holes.

3. The optical connector according to claim 1, further comprising:
   a boot that has a mounting part that mounts the pitch fixing member and attaches to the ferrule together with the pitch fixing member.

4. The optical connector according to claim 1, wherein each of the fixing parts has a hole part.

5. The optical connector according to claim 1, wherein the fixing parts are formed by a plurality of groove parts and a top wall part that restricts disengagement of the coating parts from the plurality of groove parts.

6. The optical connector according to claim 5, wherein the plurality of groove parts are formed by V-shaped grooves.

7. The optical connector according to claim 6, wherein the top wall part is formed by a plurality of V-shaped grooves.

8. The optical connector according to claim 1, wherein the coating parts of the optical fibers are supported by the fixing parts at four points.

* * * * *